Patented Oct. 1, 1929

1,729,706

UNITED STATES PATENT OFFICE

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS

RECLAIMED RUBBER

No Drawing. Continuation of application Serial No. 127,187, filed August 6, 1926. This application filed November 22, 1928. Serial No. 321,279.

The invention relates to an improvement in reclaimed rubber meaning the product obtained from rubber that has once been vulcanized and afterward devulcanized.

The present application is a continuation of my prior copending application, Serial No. 127,187, filed August 6, 1926.

The object of the invention is to obtain an improved reclaimed rubber by making it before revulcanization soft, tacky and dead in character and possessing highly workable properties without the use of softening oils or with a quantity of oil much smaller than is ordinarily employed, and which reclaimed rubber after revulcanization gives a resulting rubber resilient and elastic and with an extremely fine grain by which it is especially fitted for many manufactures especially wares requiring flexibility and softness.

In the art of reclaiming rubber it is essential that, in addition to taking care of any free sulphur that may be present in the mass and possibly a small portion of the combined sulphur, the rubber scrap be softened or plasticized to a point that will render it possible for the manufacturer to afterward mix in various pigments or a percentage of crude rubber, or both pigments and rubber. In order to do this it is essential that the reclaim possess certain characteristics. In the first place it must be plastic enough to work readily and stand a relatively high degree of heat without softening to a point that renders it difficult to mill on a warm mill. Ordinarily the manufacturer adds a large quantity of oil of various types to the various grades of reclaim in order to soften or plasticize them sufficiently for working purposes. The addition of a plasticizing oil, however, has its disadvantages. In the first place the rubber worker has found in practice that as soon as a reclaim carrying a high percentage of oil comes in contact with a heated mill it becomes so softened that it will not readily mill and will at times become so soft that it sticks to the mill. This is aggravated by the fact that in those rubbers having a high carbon black content the oil content is increased in order to effect the necessary plasticizing action. A further disadvantage which results from the use of oil as a plasticizing agent is that the oil, especially if it be used in a large quantity, tends to have a deleterious effect on the rubber after it is revulcanized.

It is accordingly within the object of my invention as first pointed out to obviate these difficulties arising from the use of oil as a softening or plasticizing agent.

I have found that the objects of my invention are attained if the reclaimed rubber has incorporated with it cleavage products resulting from the hydrolytic decomposition of collagen and which incorporation is brought about by adding collagen to the rubber to be reclaimed, and then subjecting both rubber and collagen with it to the devulcanizing process if the process of devulcanization be one embodying hydrolysis, of which the alkali and heater processes of devulcanization are examples. In both of these processes the scrap material to be reclaimed is placed in heaters or digesters and subjected to a hydrolyzing action. In other words, the effect is to obtain a reclaimed rubber resulting from the action of the hydrolyzed decomposition products of collagen upon the rubber scrap during the process of devulcanization.

As an example of the process now practised, collagen preferably either finely divided in its natural state, or previously hydrolyzed, and in liquid or dry form, is intimately mixed with the shredded scrap in the digester. If the reclaiming process is the customary alkali reclaiming process then collagen in its natural state may be added to the mass. In case, however, the heater process be employed for devulcanization then hydrolyzed collagen either in dry or liquid form should be used. The relative amount of collagen added to the rubber scrap will vary somewhat, dependent upon the results desired to be obtained. In practice preferably about two to six per cent of collagen is added to the theoretical weight of rubber in the mass to be treated. The mixture, according to the alkali process of treatment, is exposed to steam pressure, usually ranging from 100 to 200 pounds for periods of 12 to 24 hours, with the necessary additions of alkali and moisture dependent upon the kind of stock used. In the heater process the mixture is also exposed to steam under pressure for varying periods of time, dependent on the stock employed, with the addition of the necessary oil. In either case the material mixed with the scrap is subjected to a very drastic hydrolyzing action while in the digester, the hydrolyzing action in the one case being carried forward by the action of caustic, heat, pressure and moisture, and in the other case by heat, pressure and moisture. The material used is accordingly completely broken down and in either case a proportion of the cleavage products of collagen present is utilized by the rubber scrap after washing, to remove all soluble material, with the effect of softening or plasticizing it to better advantage than oil, and with the added advantage that when re-vulcanized the resulting composition is finer in texture, more pliable in quality, and with a higher tensile strength than one obtained from ordinary reclaimed rubber. It is also found in practice that a reclaimed rubber that has been plasticized with these hydrolytic decomposition products of collagen will disperse pigment in a shorter time than ordinary reclaim that has been plasticized by the use of oil. In fact, collagen gives the maximum softness and plasticity to a reclaim that can only be approached by the use of a large amount of oil and in contrast to the oil, improving the revulcanized product instead of injuring it as when a large amount of oil is used.

When the hydrolyzed collagen is used in place of collagen in its natural state I prefer that there be used the cleavage products obtained by the hydrolytic decomposition of collagen as referred to in my Letters Patent No. 1,683,862 of September 11, 1926.

The present reclaimed rubber which has been acted upon by the cleavage products of collagen, by which it is rendered more amenable to processing before revulcanization, will possess after revulcanization some of the advantages possessed by the rubber composition referred to in my aforesaid patent and the full advantages thereof may be obtained if the present reclaimed rubber, with or without fresh rubber added to it, have compounded therewith as a simple mix cleavage products of collagen as referred to in my aforesaid patent.

Having thus fully described my invention, I claim and desire to secure by Letters Patent of the United States:—

1. Reclaimed rubber obtained from rubber scrap by a devulcanizing process having a hydrolytic action, in which the rubber scrap from which the reclaimed rubber is obtained has been subjected to the action of cleavage products obtained from collagen during the process of devulcanization of the rubber scrap from which the reclaim is made.

2. Reclaimed rubber obtained from rubber scrap by a devulcanizing process having a hydrolytic action, in which the rubber scrap from which the reclaimed rubber is obtained has mixed with it collagen, and both rubber scrap and collagen with it subjected to the devulcanizing process.

CHARLES H. CAMPBELL.